Figure 1:
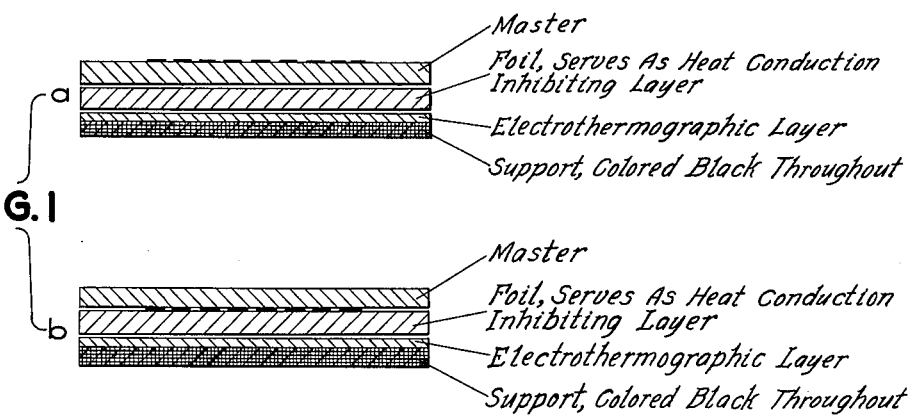

May 14, 1963  E. LIND ET AL  3,089,953
REPRODUCTION PROCESS
Filed April 13, 1960

INVENTORS
ERWIN LIND
JOHANNES MUNDER
BY

ATTORNEYS

United States Patent Office 3,089,953
Patented May 14, 1963

3,089,953
REPRODUCTION PROCESS
Erwin Lind and Johannes Munder, Wiesbaden-Biebrich, Germany, assignors to Kalle Aktiengesellschaft, Wiesbaden-Biebrich, Germany, a corporation of Germany
Filed Apr. 13, 1960, Ser. No. 22,049
Claims priority, application Germany Apr. 15, 1959
8 Claims. (Cl. 250—65)

A reproduction process has been found which is characterized in that a master is brought into mediate contact with an electrostatically charged reproduction coating which becomes electrically conductive under the influence of heat, an intermediate layer which transmits heat rays but inhibits heat conduction being interposed, the material is then exposed to heat rays, provision being made by heat-absorbing agents for the parts of the temperature sensitive reproduction coating that correspond to the image-free parts of the master to be preferentially heated, and the electrostatic image thereby produced is developed in known manner, e.g. by contact with a finely divided, possibly pigmented, resin and then fixed.

Suitable masters include very different types of ordinary thin materials with text or drawings on one side, in particular materials consisting of cellulose products or plastics, e.g. sheets of paper or plastic foils.

The materials used for the heat ray transmitting, heat conduction inhibiting intermediate layer may be any thin foils, provided they adequately transmit heat rays and are capable of inhibiting heat conduction. For example, foils made of cellulose products, e.g. paper, cellulose hydrate; cellulose esters, such as cellulose acetate, cellulose propionate and cellulose acetobutyrate; various plastics, e.g. polyolefines such as polyethylene, polypropylene; polyvinyl alcohol, polyvinyl chloride and polyvinylidene chloride, polyamides; polyesters, such as polyterephthalic acid glycol ester, polycarbonates and polyurethanes may be used. Foils of cellulose acetate, polyolefines, polyvinyl compounds with chlorine content, and polyesters are particularly suitable. It is also possible for thin glass plates to be used, but in general flexible foils are preferable.

The intermediate heat ray transmitting and heat conduction inhibiting layer should preferably be highly transparent. However, the layer may also consist of a material in which pigments are incorporated. To be heat ray transmitting, the average particle size of the pigments should be below $1\mu$, preferably below $0.5\mu$. The amount of the pigment incorporated in the heat ray transmitting layer can be from about 0.1 to about 10% by weight. Larger or smaller amounts may also be used. The preferred amount of the pigments is in the range from about 0.3 to about 3%.

As pigments, there may be used, e.g., metal oxides, such as zinc oxide, titanium dioxide, aluminum oxide; metal salts, such as calcium sulfate, barium sulfate, barium carbonate, calcium carbonate; metal sulfides, such as zinc sulfide, mercury sulfide; and phthalo-cyanine and other dye-pigments, which are described in the "Color Index," 2nd edition, vol. 3, pages 3569–3573 and pages 3603–3637. Mixtures of pigments may also be used.

The intermediate heat ray transmitting and heat conduction inhibiting layers may also be colored by a suitable dyestuff. For these materials, especially the so-called dispersion dyestuffs are used. The dispersion dyestuffs are described in the "Color Index," vol. 1, pages 1655–1742.

Materials that are of interest for the reproduction coatings with temperature sensitive conductivity—hereinafter such coatings will be called "electrothermographic coatings"—include products of very different types, but particularly those in the nature of resins or synthetic resins. The suitability of these substances for the process in question can be ascertained by evaluation of the current-flow resistance as a function of temperature, whereupon it will be apparent whether there is adequate loss of resistance with increasing temperature. It is, however, very often possible in the case of substances that do not undergo sufficient loss of resistance in the heat for the desired effect to be achieved by the admixture of a second substance; polystyrene, for example, does not show sufficient loss of resistance with increasing temperature, but if a plasticizer, such as tricresyl phosphate, is added, the required resistance characteristics are obtained.

Suitable material for the electrothermographic coating will have its resistance decreased, when heated from room temperature to decomposition point, by at least $10^2$. Materials which when heated from room temperature to softening point have their resistance decreased by more than one power of ten are preferable. The use of substances which when heated from room temperature to 100–150° C. have their resistance decreased by more than $10^4$ is particularly to be recommended. Also, materials having in normal conditions a specific resistance of such height that they are suitable for holding an electrostatic charge for some time are applicable to this purpose. The specific resistance of such substances is in general from $10^8$ to $10^{19}$ ohm.cm.

Substances suitable for use as electrothermographic coatings in accordance with the invention include both natural and synthetic resins and plastic substances, e.g. shellac, colophony, polyvinyl compounds containing chlorine and interpolymers of such substances, e.g. polyvinyl chloride, chlorinated polyvinyl chloride, chlorinated rubber, copolymers of vinyl chloride with butadiene, polyvinyl compounds such as polystyrene, polyacrylic acid esters, interpolymers of polyacrylonitrile, polyolefines such as polyethylene, polypropylene, polybutylene, polyesters such as polyterephthalic acid glycol ester, mixed esters of terephthalic acid and isophthalic acid, polycarbonates, coumarone resins, indene resins and maleic acid resins, ketone resins, polyvinyl acetate and interpolymers of polyvinyl acetate, phenol resins, interpolymers of styrene and maleic anhydride.

The resins mentioned can be used in association one with another or in association with organic and inorganic pigments, particularly those of which the electrical resistance drops under the influence of heat, e.g. zirconium dioxide or zinc oxide, or sensitizers and fillers. The electrothermographic layers described above, if capable of forming flexible self-supporting sheets, can be used as such. Also, however, they can be used in the form of a thin coating applied to a supporting material. Many different types of supporting material are possible, e.g. glass plates, metal foils, made for example of aluminum, zinc, copper or chromium, paper, cellulose products, such as cellulose hydrate, cellulose esters, plastics of all kinds such as polyolefines, polyethylene, polypropylene, polyvinyl alcohol, polyvinyl chloride, polyvinylidene chloride, polyamides, polyesters such as polyterephthalic acid glycol ester and polyurethanes.

Another effective form in which the process can be carried out consists in the application of the electrothermographic coating to the heat ray transmittent but heat conduction inhibiting intermediate layer.

It is further possible for the electrothermographic layers, if they are self-supporting, to be used simultaneously as intermediate layers. This is possible if the material is given an adequate thickness. Thicknesses of more than $20\mu$ up to about $300\mu$ are regarded as adequate. It is possible for greater thicknesses to be used, but in general no improvement of the effect is achieved thereby.

Heat absorbent materials that can be used are those that heavily absorb heat rays and convert them into pereceptible heat. Possible materials are dark-colored layers or layers consisting of dark material, e.g. plastics or paper foils colored black throughout. Foils of this kind to which a black coating has been applied are particularly suitable. Photographic papers or films which have been exposed to light, developed and fixed are very suitable. It is also possible for a dark dyestuff or a dark substance such as carbon black to be added directly to the electrothermographic coatings and an effect to be thereby achieved. The essential point is that dark-colored, preferably black, materials should be brought into contact with the electrothermographic layer either by layer-contact or by the presence of both materials in one layer. The heat-absorbent substance is preferably so selected that it will have an absorption maximum in the wave-length range of the heat-radiator used.

Suitable heat-radiation sources are those which are at a sufficiently high temperature, i.e. 400–2000° C., preferably 800–1500° C. Normally, commercially available infrared radiators are used.

It is advisable for the quantity of heat necessary to be applied in a brief radiation of high intensity. In this way, sharper images are obtained than with the same quantity of heat applied by less intensive radiation of longer duration. Referring to the accompanying drawings, FIGURE 1a discloses one embodiment of the invention in which a master having the printed side thereof facing upwardly, is placed upon an intermediate layer which transmits heat rays but inhibits heat conduction and the two are placed on a reproduction material consisting of a black-colored support having an electrothermographic coating.

Figure 2:
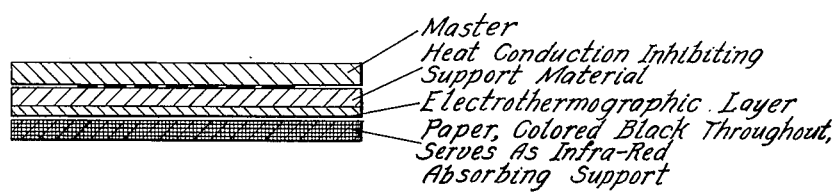
Figure 3:
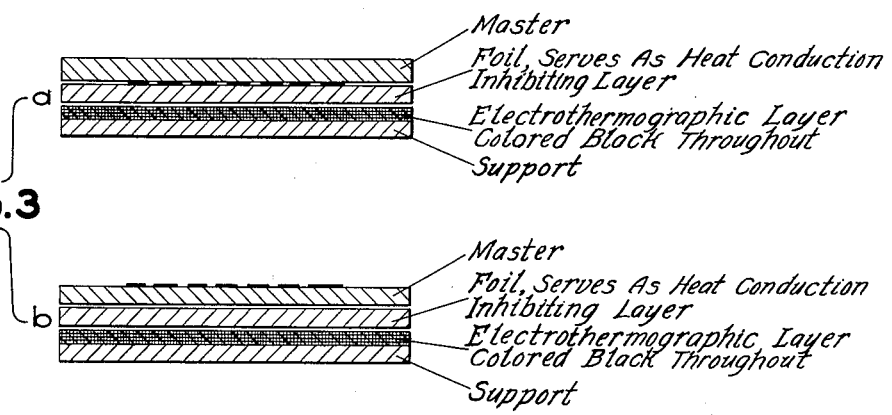
Figure 4:
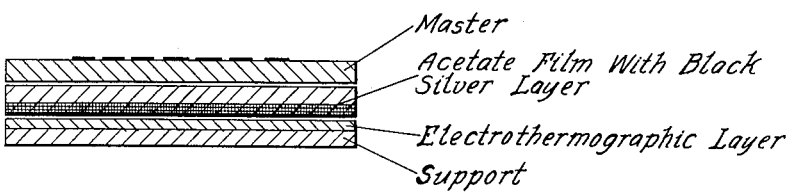

FIGURE 1b discloses a variation of the embodiment of FIGURE 1a, in which the master is placed with the printed side thereof adjacent the intermediate layer, FIGURE 2 discloses a further embodiment in which the printed side of the master faces downwardly and the electrothermographic layer is on the lower side of the intermediate layer, FIGURE 3a discloses a further embodiment in which the printed side of the master faces downwardly and the electrothermographic layer is colored black and is on the support, FIGURE 3b discloses a further embodiment in which the printed side of the master faces upwardly and the electrothermographic layer is colored black and is on the support, and FIGURE 4 discloses a further embodiment in which the printed side of the master faces upwardly, the intermediate layer has a black-colored layer on the lower side thereof and the electrothermographic layer is on the support.

For performing the process according to one modification thereof, a master with printing on one side is placed with its reverse side upon an intermediate layer which transmits heat rays but inhibits heat conduction and the two together are placed on a reproduction material consisting of a support, e.eg. a black paper, having an electrothermographic coating. This is illustrated in FIG. 1a of the accompanying drawings. This reproduction coating is previously given an electrostatic charge, e.g., by a corona discharge. The several superposed layers are irradiated through the master and in this way an electrostatic image corresponding to the master is obtained on the reproduction material. This can be made visible in known manner by dusting over with a resin powder such as is employed in the known electrophotographic process and is fixed by heating or by treatment with a solvent. Images corresponding to the master are obtained on a dark background. If light colored resin powder is used, clearly legible copies are obtained. If dark copies on light ground are required, a dark resin powder is used and the image is transferred, a paper being placed under the unfixed copy and a voltage applied thereto, so that a mirror image is obtained on the transfer paper. If a correct image is required on a transfer paper, the master is placed coated side on. FIG. 1b of the accompanying drawings illustrates a variation of the foregoing in which the master is placed with the printed side thereof adjacent the intermediate layer.

In another method in which the process can be carried out, as illustrated in FIGS. 3a and 3b of the accompanying drawings showing two variations in the position of the printed side of the master, a reproduction material can be used in which the electrothermographic coating contains the heat absorbing agent, e.g. carbon black, instead of the reproduction material consisting of a black support and an electrothermographic coating. In another modification, illustrated in FIG. 4 of the accompany drawings, a foil which has a heat absorbing coating on the side opposite the reproduction material, e.g. an exposed, developed and fixed photographic material, is used as the heat ray transmitting, heat conduction inhibiting intermediate layer on the reproduction material.

A particularly advantageous form of the present invention is that in which a reproduction material consisting of the heat ray transmitting, heat conduction inhibiting intermediate layer with an electrothermographic coating is placed on a black heat absorbent layer. This is illustrated in FIG. 2 of the accompanying drawings. The electrothermographic coating is placed on the black, heat absorbent layer. The master is then placed on this reproduction material and further procedure is as described above.

In a further simplified modification, a substance is used as reproduction material which combines the function of the intermediate layer and that of the electrothermographic coating. In this simplest form of all, a material, e.g. a foil made of polyester, a synthetic substance containing chlorine, or a polyolefine, is provided with an electrostatic charge and placed with the charged surface thereof upon a heat radiation absorbing, for example, a black base. The master is placed on top. After irradiation with heat, an electrostatic image is obtained on the reproduction material which, after the black layer has been removed, is developed and fixed in the usual manner. This last method can easily be adapted for continuous processing. The reproduction material can be provided with an electrostatic charge and passed over a block roller. A master is placed upon the reproduction material while it is on the roller and the material, during its simultaneous contact with the master and black roller, is irradiated by the heat source and then developed and fixed. With this last very simple and effective process, direct intermediate copies suitable for further reproduction, possibly by other methods, are obtained if the electrothermographic material used is highly transparent.

If the reproduction material used is opaque (light-diffusing), e.g. from the incorporation of pigments, copies with good contrast are obtained.

The electrothermographic process herein described provides a very simple and rational method for the preparation of copies and has a great advantage over electrophotographic processes in that the electrostatically charged reproduction coatings do not become discharged under the influence of light so that with these materials neither before nor after the production of the charge image does work have to be done with the exclusion of light.

*Example I*

10 parts by weight of a high molecular weight ester of a mixture of terephthalic acid (70%) and isophthalic acid (30%) with glycol are dissoved in 200 parts by volume of chloroform and this solution is coated upon a black colored paper and then dried. The reproduction material thus produced is negatively charged by corona discharge to a surface potential of about 300 volts above earth. A 100μ thick cellulose acetate foil is placed upon the charged reproduction coating as intermediate layer and on top of this, with its back in contact with the intermediate layer, a master with printing on one side only, e.g. a customary type-written paper. The master is irradiated with a heat radiator with a heat radiator and the invisible electrostatic image thereby produced, which corresponds to the master, is treated with a developer consisting of 100 parts by weight of glass balls of a grain size of 350–400μ and 2 parts by weight of a resin prepared by the melting together, grinding and screening of 30 parts by weight of polystyrene, 30 parts by weight of a maleic resinate, and 3 parts by weight of carbon black. The toner is best used in a medium grain size of about 20–50μ. In this development process the back-pigmented resin powder adheres to the electrostatically charged parts of the reproduction coating. An image corresponding to the master is obtained which is not resistant to rubbing but is made so by heating, a dark image on a dark ground being produced.

In a modification the master is placed image-side upon the cellulose acetate intermediate foil, the rest of the procedure up to and including the development step being as described above. The mirror image of the master thereby obtained is transferred to a paper. For the transfer of the powder image onto the paper, the latter is laid on the image and charged electrostatically from the back, the polarity being the same as the charge which was applied to the thermoelectroconductive layer in the beginning of the process. The image thereby transferred, which is a correct image corresponding to the master, is fixed by heating. If a transparent foil is used instead of the paper, intermediate originals suitable straightaway for further copying, e.g. on diazo paper, are obtained. Instead of paper or a transparent foil, textile fabric may be used.

*Example II*

15 parts by weight of a chlorinated polyvinyl chloride containing about 60% of chlorine are dissolved in a mixture of 120 parts by volume of toluene and 80 parts by volume of methyl-ethyl-ketone. This solution is coated upon a cellulose hydrate foil of a thickness of 80–100μ and is then dried. The reproduction material thus produced is negatively charged by corona discharge to a surface potential of 400 volts above earth and is then placed with the charged coating downwards upon plastic or paper foil which is colored black throughout. The master, e.g. a photographic diapositive, with the text side downwards is laid upon the uncoated side of the cellulose hydrate foil and the several layers are passed together at a speed of several metres a minute through the image-plane of a focussed 1375-watt infra-red radiator. The coating becomes heated to 80–100° C. under the absorbent parts of the master and in these parts the specific resistance decreases from about $10^{14}$ ohm.cm. to about $10^{10}$ ohm.cm. An electrostatic correct image corresponding to the master is formed on the reproduction coating. It is made visible by dusting over with a resin powder as described in Example I. For the fixing of the powder image the coating is heated. If a further cellulose hydrate acetate foil or polyvinyl foil is placed between master and coated cellulose hydrate foil, a certain heightening of image quality in respect of contrast can be obtained.

*Example III*

15 parts by weight of chlorinated polyvinyl chloride are dissolved in a mixture of 120 parts by volume of toluene and 80 parts by volume of methyl-ethyl-ketone. 1.5 parts by weight of carbon-black are suspended in this solution and the suspension is coated upon paper precoated against the penetration of organic solvents. The reproduction coating with carbon-black content is negatively charged to a surface potential of 300 volts above earth. A cellulose acetate foil of a thickness of about 200μ is placed thereon and on top of this the master, with the image side downwards. Heat rays are then passed through the master by means of an infra-red radiator whereupon an electrostatic image corresponding to the master but mirrorwise reversed is obtained. It is treated with the developer described in Example I. The powder image is then transferred to another material as described in detail in Example I so that a correct image corresponding to the master is obtained. It is fixed by the action of heat or solvent.

If in the process just described the master is placed in position with the image-side outwards and a developer is used with a white pigmented toner, correct images corresponding to the master are obtained in white on black ground.

The process just described can also be modified to the extent that a considerably smaller quantity of carbon-black (2%) is incorporated in the reproduction coating so that with the procedure described a black image on grey ground is obtained.

*Example IV*

12 parts by weight of polysteyrene are dissolved in 120 parts by volume of chlorobenzene and 80 parts by volume of toluene. 1.2 parts by weight by tricresyl phosphate are added as plasticizer. This solution is coated upon a paper coated with a polyvinylidence chloride dispersion against the penetration of organic solvents and it is dried. The reproduction coating is negatively charged by corona discharge to a surface potential of about 400 volts above earth and photographic film which as a result of exposure, development and fixing has a black silver coating on one side, is laid coated side thereon and the master placed with the reverse side on the photographic film intermediate layer. An infra-red radiator is then beamed upon the master. An electrostatic image corresponding to the master is thereby formed on the polystyrene. It is made visible by powdering over with a resin powder and then fixed by heat treatment. In this way a directly legible copy with very good contrast is obtained on white ground.

It will be obvious to those skilled in the art that many modifications may be made within the scope of the present invention without departing from the spirit thereof, and the invention includes all such modifications.

What is claimed is:

1. A reproduction process which comprises placing a master in indirect contact with an electrostatically charged reproduction surface, an intermediate heat ray transmitting and heat conduction inhibiting layer being between the master and charge surface, irradiating the superposed layers while utilizing a heat absorbing agent to effect preferential heating of those parts of the reproduction surface which correspond to the image free areas of the master, and developing the invisible electrostatic image thereby produced on the reproduction surface to produce a visible image.

2. A process according to claim 1 in which the intermediate layer is transparent.

3. A process according to claim 1 in which the intermediate layer is pigmented.

4. A reproduction process which comprises placing a master in contact with an intermediate heat ray transmitting and heat conduction inhibiting layer, placing the latter layer in contact with a electrostatically charged electrothermographic coating mounted on a heat absorbent layer, irradiating the superposed layers through the master to thereby produce an invisible electrostatic image on the electrothermographic coating, and developing the invisible image to produce a visible image.

5. A reproduction process which comprises placing a master in contact with an intermediate heat ray transmitting and heat conduction inhibiting layer, placing the latter layer in contact with an eletcrostatically charged, heat absorbent electrothermographic coating mounted on a support, irradiating the superposed layers through the master to thereby produce an invisible electrostatic image on the electrothermographic coating, and developing the invisible image to produce a visible image.

6. A reproduction process which comprises placing a master in contact with an intermediate heat ray transmitting and heat conduction inhibiting layer having a heat absorbent surface on the side thereof distal the master, placing the latter layer in contact with an electrostatically charged, electrothermographic coating mounted on a support, irradiating the superposed layers through the master to thereby produce an invisible electrostatic image on the electrothermographic coating, and developing the invisible image to produce a visible image.

7. A reproduction process which comprises placing a master in contact with a intermediate heat ray transmitting and heat conduction inhibiting layer having an electrostatically charged electrothermographic coating on the side thereof distal the master, placing the latter layer in contact with a heat absorbent layer, irradiating the superposed layers through the master to thereby produce an invisible electrostatic image on the electrothermographic coating, and developing the invisible image to produce a visible image.

8. A reproduction process which comprises placing a master in contact with an intermediate heat ray transmitting and heat conduction inhibiting layer having an electrostatic charge on the side thereof distal the master, placing the latter layer in contact with a heat absorbent layer, irradiating the superposed layers through the master to thereby produce an invisible electrostatic image on the electrothermographic coating, and developing the invisible image to produce a visible image.

References Cited in the file of this patent
UNITED STATES PATENTS

| | | |
|---|---|---|
| Re. 24,554 | Clark | Oct. 21, 1958 |
| 2,297,691 | Carlson | Oct. 6, 1942 |
| 2,647,464 | Ebert | Aug. 4, 1953 |
| 2,798,960 | Moncrieff-Yeates | July 9, 1957 |
| 2,817,765 | Hayford | Dec. 24, 1957 |
| 2,939,787 | Giaimo | June 7, 1960 |
| 3,013,890 | Bixby | Dec. 19, 1961 |

OTHER REFERENCES

New Developments in Xeroradiography, by McMaster, Non-destructive Testing, Vol. 10, No. 1, Summer Number, 1951, pages 8 to 25.